United States Patent
Ferslew et al.

(10) Patent No.: US 10,982,546 B2
(45) Date of Patent: Apr. 20, 2021

(54) FLOW-DIVERTING SYSTEMS FOR GAS TURBINE AIR SEPARATOR

(71) Applicant: General Electric Company, Schenectady, NY (US)

(72) Inventors: Matthew Ryan Ferslew, Simpsonville, SC (US); Philip Lynn Andrew, Simpsonville, SC (US); Joseph Chapman, Easley, SC (US); Paul Stephen DiMascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 16/135,707

(22) Filed: Sep. 19, 2018

(65) Prior Publication Data
US 2020/0088036 A1 Mar. 19, 2020

(51) Int. Cl.
*F01D 5/08* (2006.01)
*F02C 7/18* (2006.01)
(Continued)

(52) U.S. Cl.
CPC .......... *F01D 5/084* (2013.01); *F01D 25/243* (2013.01); *F02C 7/18* (2013.01); *F02C 9/18* (2013.01); *F05D 2260/201* (2013.01)

(58) Field of Classification Search
CPC .......... F01D 5/081; F01D 5/082; F01D 5/084; F01D 5/085; F05D 2240/81;
(Continued)

(56) References Cited

U.S. PATENT DOCUMENTS 5,951,250 A * 9/1999 Suenaga ................. F01D 5/085
 415/115
6,151,881 A * 11/2000 Ai ........................... F01D 5/081
 415/115

(Continued)

OTHER PUBLICATIONS

Combined Cycle Journal Online, Archives, 4Q-2009, "Recovering from a Wreck." Published by PSI Media, Inc., Las Vegas, NV. Retrieved from: http://www.ccj-online.com/4q-2009/recovering-from-a-wreck/.

(Continued)

*Primary Examiner* — Courtney D Heinle
*Assistant Examiner* — Sang K Kim
(74) *Attorney, Agent, or Firm* — Charlotte Wilson; James Pemrick

(57) ABSTRACT

A flow diverter for an air separator of a gas turbine includes a cylindrical body configured to fit within a cooling hole of the air separator. One or more air flow vents are defined through and around a partial circumference of the cylindrical body. A bottom panel closes the cylindrical body at one end. A mounting flange surrounds the cylindrical body at an open end and extends radially outward from the cylindrical body. When the flow diverter is installed, air flows through the open end in a radial direction and exits through the air flow vents in an axial direction. The cylindrical body may include a collapsible region that collapses to engage the air separator and prevent the flow diverter from being dislodged. The air separator may additionally or alternately include supplemental cooling holes in a recessed area proximate to its mounting flange.

19 Claims, 10 Drawing Sheets

(51) Int. Cl.
*F02C 9/18* (2006.01)
*F01D 25/24* (2006.01)

(58) Field of Classification Search
CPC .......... F05D 2260/20; F05D 2260/201; F05D 2260/205; F02C 7/18; F02C 9/18
See application file for complete search history.

(56) References Cited

U.S. PATENT DOCUMENTS

| | | | |
|---|---|---|---|
| 6,379,117 B1 | 4/2002 | Ichiryu | |
| 6,837,676 B2 | 1/2005 | Yuri et al. | |
| 7,669,425 B2 | 3/2010 | Liang | |
| 7,958,734 B2 | 6/2011 | Paprotna et al. | |
| 7,993,102 B2 | 8/2011 | Desai et al. | |
| 10,036,256 B2 | 7/2018 | Kowalski et al. | |
| 2007/0271930 A1 | 11/2007 | Takaoka et al. | |
| 2008/0141677 A1 | 6/2008 | Brillert | |
| 2009/0232637 A1* | 9/2009 | Propheter-Hinckley | F01D 9/065 415/116 |
| 2012/0087784 A1* | 4/2012 | Widener | F02C 7/18 415/180 |
| 2014/0290254 A1* | 10/2014 | Manning | F01D 9/02 60/752 |
| 2015/0322817 A1* | 11/2015 | Chehab | F01D 5/066 60/412 |
| 2015/0330238 A1* | 11/2015 | Manzoori | F02C 7/18 415/115 |
| 2016/0123152 A1* | 5/2016 | Nereim | F01D 11/005 415/116 |
| 2019/0234235 A1* | 8/2019 | Anderson | F01D 25/12 |
| 2019/0242407 A1* | 8/2019 | Giannakopoulos | F04D 29/102 |

OTHER PUBLICATIONS

Combined Cycle Journal Online, Issue 54, 1Q-2018, 501F Users Group, "501F Users Group: Compelling Program Makes This Annual Meeting a Top Priority." Published by PSI Media, Inc., Las Vegas, NV. Retrieved from http://www.ccj-online.com/issue-54/501f-users-group-compelling-program-makes-this-annual-meeting-a-top-priority/.

* cited by examiner

FLOW-DIVERTING SYSTEMS FOR GAS TURBINE AIR SEPARATOR

TECHNICAL FIELD

The present disclosure relates generally to the field of gas turbines and, more particularly, to air separators for a gas turbine, which have been modified to redirect air flow through or around the air separator to improve torque tube durability.

BACKGROUND

Some conventional turbo machines, such as gas turbine systems, are utilized to generate electrical power. In general, a gas turbine system 2 (a portion of which is illustrated in FIG. 1) includes a compressor 10, one or more combustors 20, and a turbine 30. Air may be drawn into the compressor 10, via its inlet, where the air is compressed by passing through multiple stages of stationary vanes 12 and rotating blades 14. The compressed air is directed to the one or more combustors 20, where fuel is introduced, and a fuel/air mixture is ignited and burned to form combustion products. The combustion products function as the operational fluid of the turbine 30.

The operational fluid then flows through a fluid flow path in a turbine 30, the flow path being defined between a plurality of stationary nozzles 32 and a plurality of rotating blades 34 disposed between the stationary nozzles 32, such that each set of stationary nozzles 32 and each corresponding set of rotating blades 34 defines a turbine stage. As the plurality of rotating blades 34 rotate the rotor 40 of the gas turbine system 10, a generator (not shown), coupled to the rotor 40, may generate power from the rotation of the rotor 40. The rotation of the turbine blades 34 also causes rotation of the compressor blades 14, which are coupled to the rotor 40.

In some gas turbines, the rotor 40 is formed by stacking a series of rotor wheels and, optionally, spacer components to form sections of the stacked rotor. It is well known to couple a torque tube 50 between the compressor section of the stacked rotor (represented by rotor wheel 16) to the turbine section of the stacked rotor (represented by rotor wheel 36). The torque tube 50 includes a bulky forward end 52 that is connected to the compressor rotor wheel 16, a bulky aft end 56 that is connected to the turbine rotor wheel 36, and a thin intermediate section 53 extending axially between the forward end 52 and the aft end 56. The aft end 56 of the torque tube 50 is circumferentially surrounded by an air separator 60.

The air separator 60 has a generally cylindrical shape and includes a forward flange 64 and an aft flange 66. The forward flange 64 is connected, via a circumferential array of bolts, to the torque tube 50 at an intermediate flange 54 extending radially outward from the intermediate section 53 proximate to the aft end 56. The air separator 60 defines a circumferential array of cooling holes 62 to direct cooling air 72 for the rotor 40 and the turbine components (e.g., blades 34) from a cooling air duct 70 into an annulus 80 between the air separator 60 and the aft end 56 of the torque tube 50. This cooling air 72 impinges directly on the aft end 56 of the torque tube 50.

It has been observed that the torque tube 50 may experience thermal stress due to the insufficient and mal-distributed cooling in the area inboard of the air separator 60. The direct impingement of cooling air 72 further exacerbates these thermal stresses. Cracking of the torque tube 50 in this region may lead to vibration events in the gas turbine, which in turn may lead to forced outages. The presence of the air separator 60 makes visual detection of the cracks impossible without costly and time-consuming disassembly of the rotor shaft 40.

Prior efforts to reduce the thermal stress included providing relief grooves 58 at the aft end of the torque tube 50 near the bolt connecting the torque tube 50 to the turbine section of the rotor 40; and increasing the thickness of the torque tube 50. However, such efforts have proven unsuccessful, and improvements in the cooling configuration of the torque tube 50 and the air separator 60 are needed to minimize or delay cracking and to extend the useful life of the torque tube 50.

SUMMARY

According to one aspect herein, a flow diverter for an air separator of a gas turbine includes a cylindrical body configured to fit within a cooling hole of the air separator. One or more flow vents are defined through and arranged around a portion of a circumference of the cylindrical body. A bottom panel closes the cylindrical body at one end. A mounting flange surrounds the cylindrical body at an open end and extends radially outward from the cylindrical body. When the flow diverter is installed, air flows through the open end in a radial direction and exits through the air flow vents in an axial direction, relative to a centerline of the gas turbine. The cylindrical body may include a collapsible region that collapses to engage the air separator and prevent the flow diverter from being dislodged.

According to another aspect herein, an air separator for a gas turbine is provided, which may be used with a flow diverter, as described above. The air separator includes: a forward flange comprising a plurality of bolt holes circumferentially arrayed about the forward flange; an aft flange axially spaced from the forward flange; and a cylindrical body extending between the forward flange and the aft flange. The cylindrical body defines a plurality of cooling holes disposed circumferentially around the cylindrical body and further includes a recessed portion extending circumferentially around the cylindrical body proximate to the forward flange. The recessed portion defines a plurality of supplemental cooling holes arrayed circumferentially around the recessed portion. In one embodiment, one or more flow diverters may be installed in the cooling holes.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Figure 1:
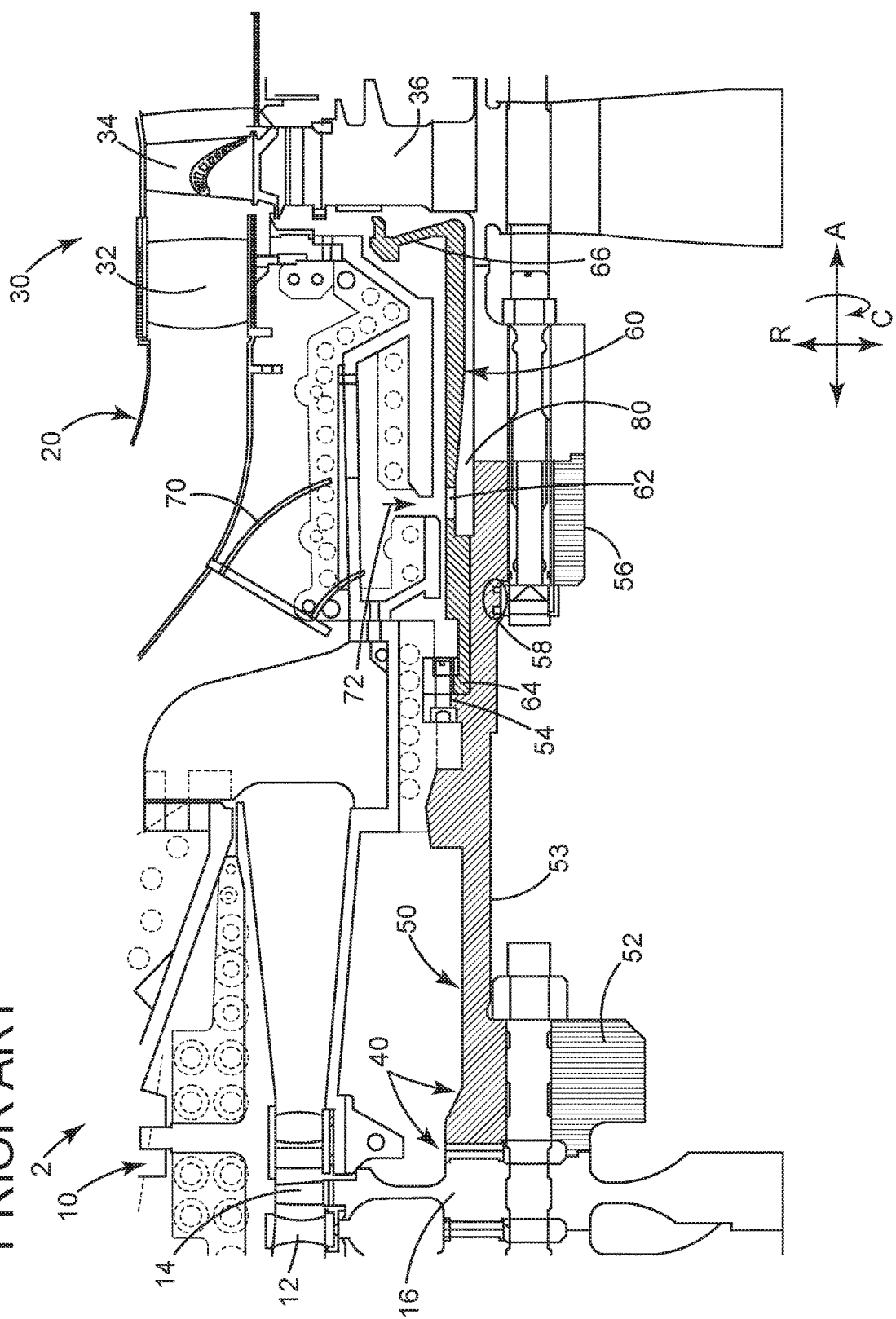
FIG. 1 is a cross-sectional view of a portion of a gas turbine having a conventional stacked rotor, which includes a torque tube and an air separator.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current flow-diverting systems for a gas turbine air separator, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft centerline, while the term "outer" is used to describe components distal to the turbine shaft centerline.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of air separators for a land-based power-generating gas turbine for purposes of illustration, one of ordinary skill in the art will readily appreciate that embodiments of the present disclosure may be applied to other locations within a turbomachine and are not limited to turbine components for land-based power-generating gas turbines, unless specifically recited in the claims.

Figure 2:
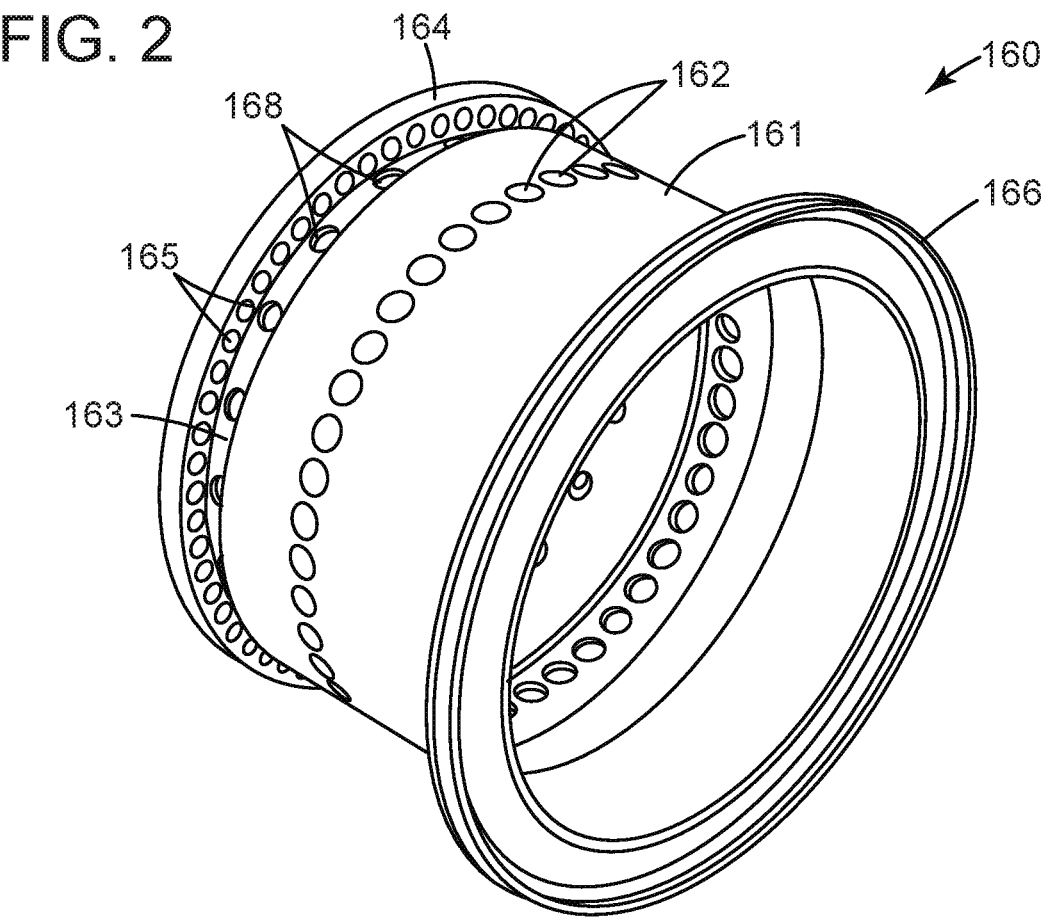
FIG. 2 is a perspective view of an air separator suitable for use with the gas turbine of FIG. 1, according to one aspect of the present disclosure.
Figure 3:
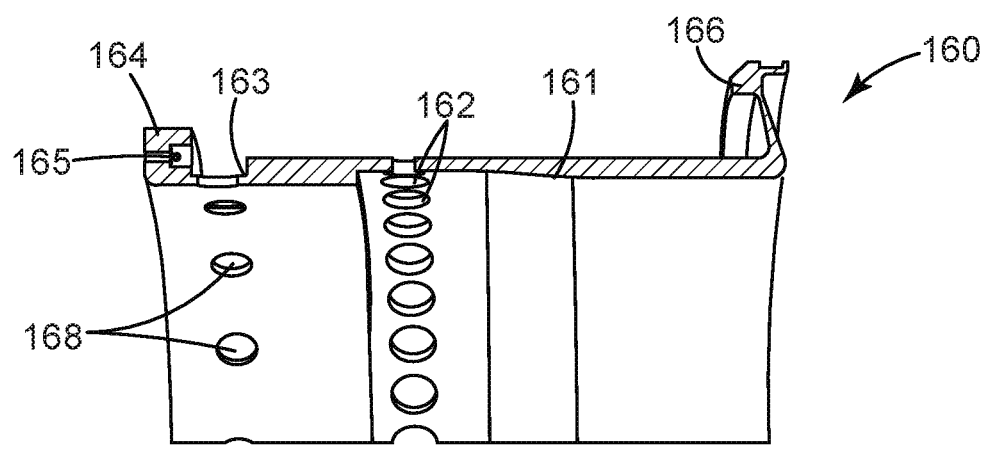
FIG. 3 is a cross-sectional view of a portion of the air separator of FIG. 2.

Referring now to the drawings, FIGS. 2 and 3 illustrate an air separator 160, according to one aspect of the present disclosure. The air separator 160 includes a cylindrical body 161 that extends between a forward flange 164 at the forward end and an aft flange 166 at the aft end. Bolt holes 165 are defined in a circumferential array through the forward flange 164. Cooling holes 162 are defined in a circumferential array through the cylindrical body 161 in a single axial plane between the forward flange 164 and the aft flange 166. The outer surface of the cylindrical body 161 further defines a circumferential recess 163 that is proximate to the forward flange 164.

To promote the cooling of the thin intermediate section 53 of the torque tube 50 (as shown in FIG. 1), a series of supplemental cooling holes 168 are defined in a circumferential array through the recess portion 163 of the cylindrical body 161. The supplemental cooling holes 168 are in fluid communication with the turbine's extant cooled cooling air system and divert flow through the cylindrical body 161 at a location upstream of the cooling holes 162. Air flowing through these supplemental cooling holes 168 impinges upon the intermediate section 53 of the torque tube 50 upstream of the area prone to cracking to mitigate the thermal gradient sustained during a transient event. In one exemplary embodiment, the number of supplemental cooling holes 168 is less than the number of cooling holes 162, and the diameter of the supplemental cooling holes 168 is less than the diameter of the cooling holes 162.

Figure 6:
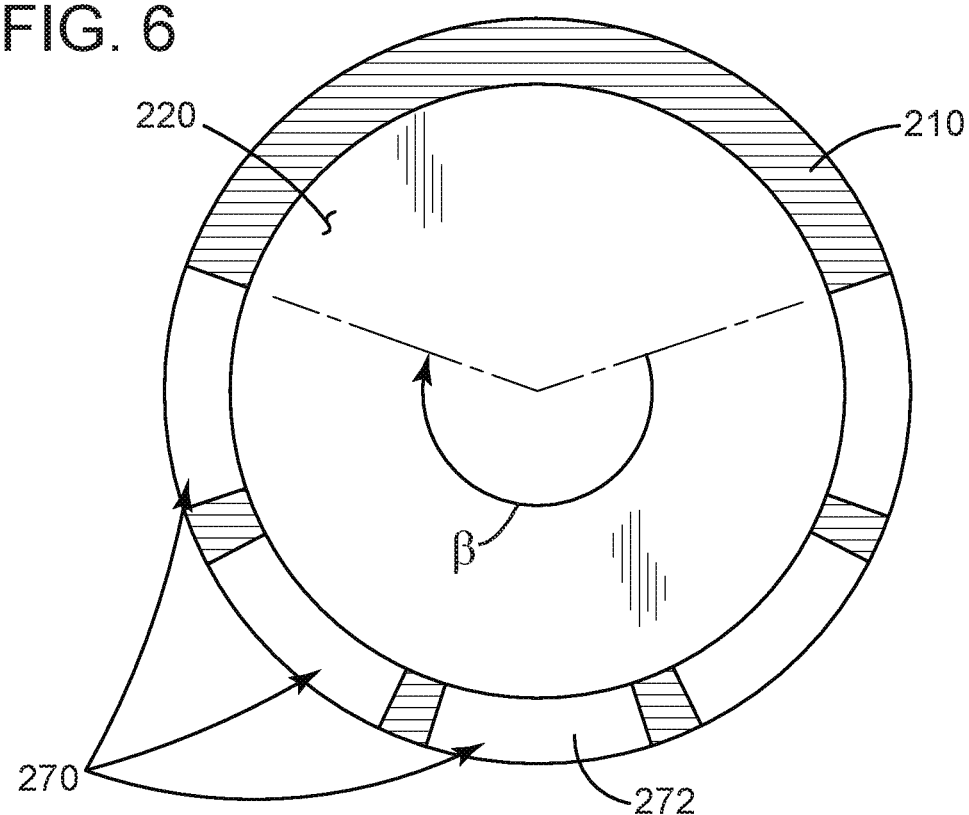
FIG. 6 is a schematic plan view of the flow diverter of FIG. 4, as taken through line A-A of FIG. 5.
Figure 7:
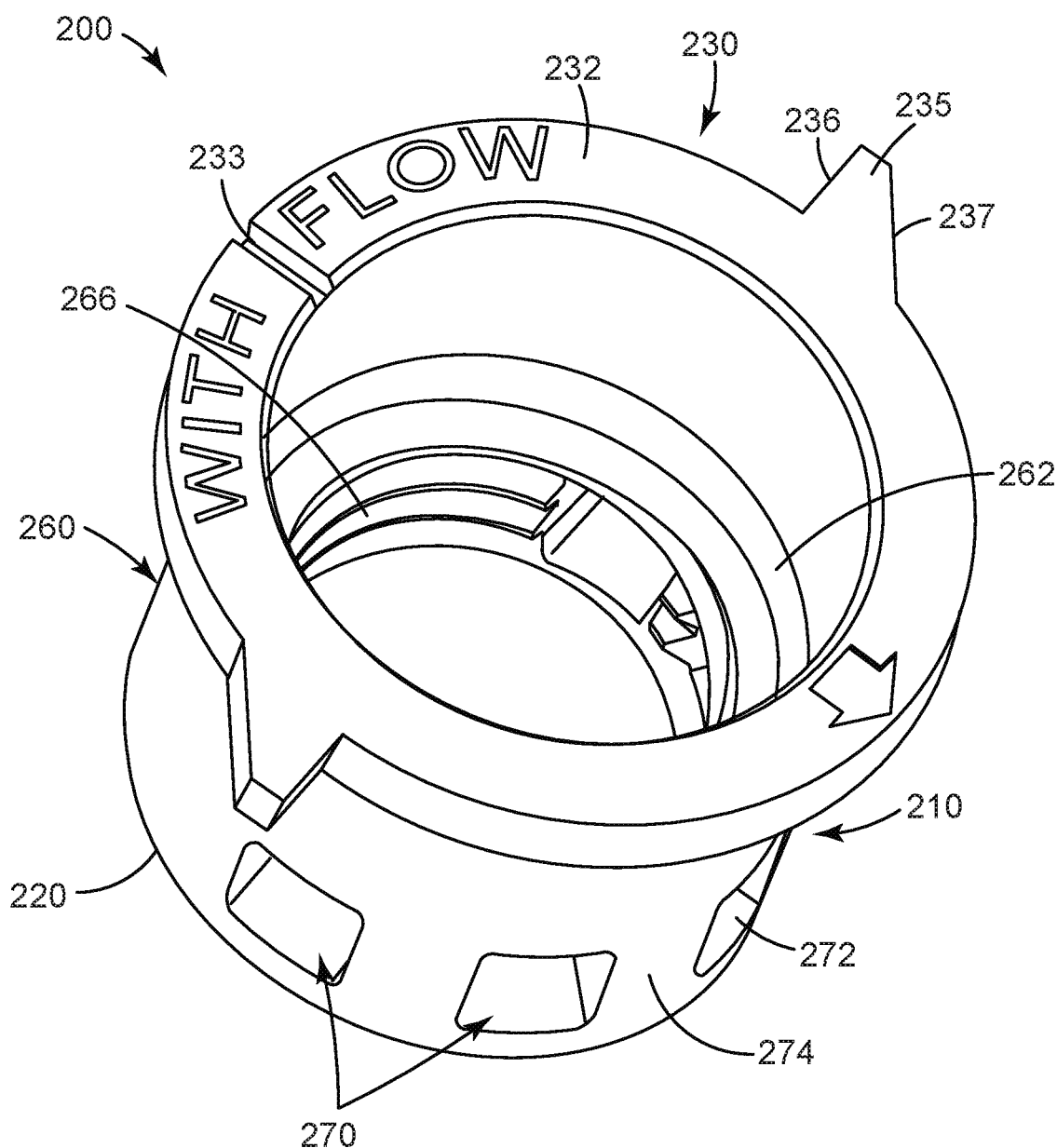
FIG. 7 is a top perspective view of the flow diverter of FIG. 4.
Figure 8:
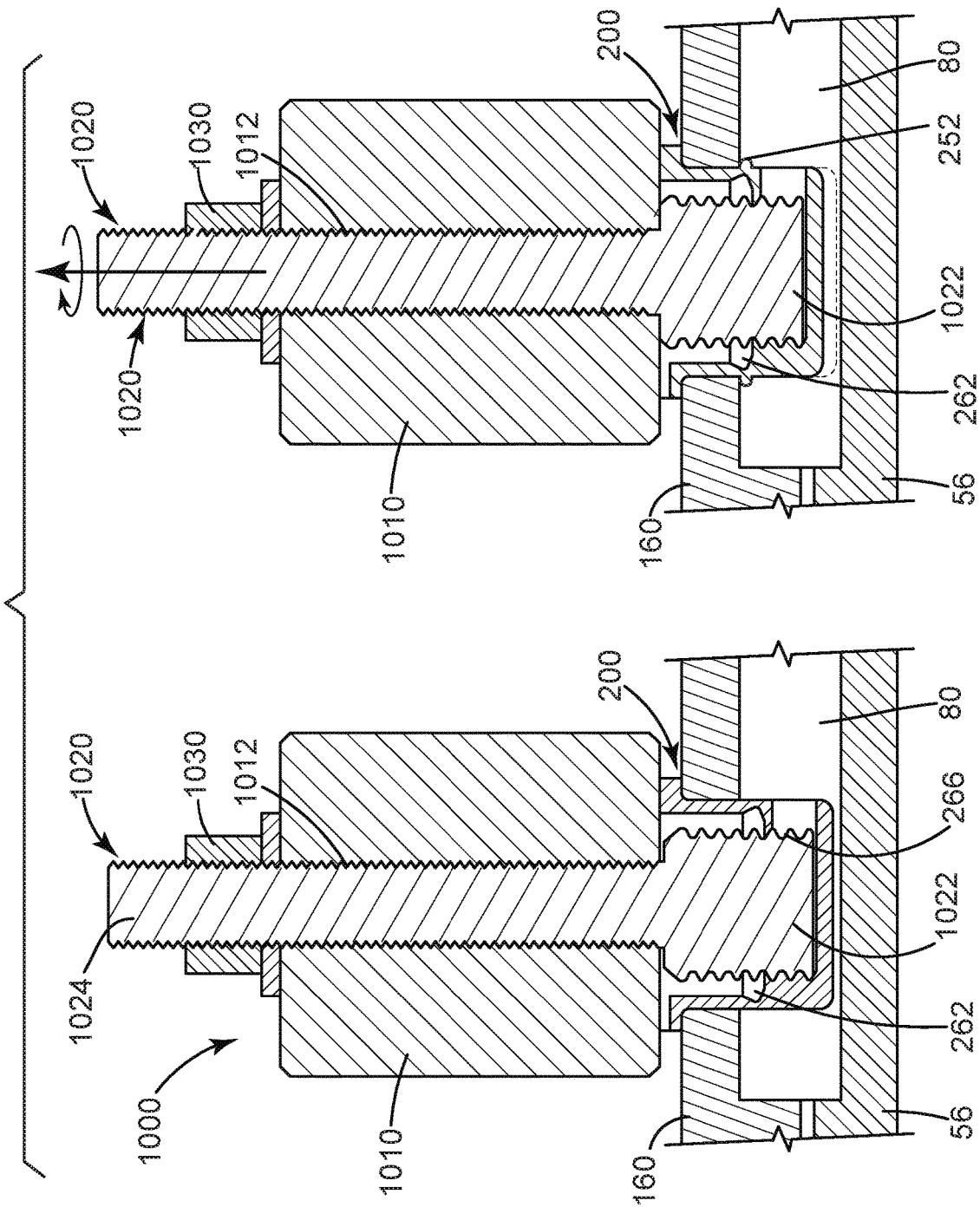
FIG. 8 presents side views of an installation tool and method for installing the flow diverter of FIG. 4.

FIGS. 4 through 9 illustrate a flow-diverting system for diverting flow through the air separator 160, according to another aspect of the present disclosure. A flow diverter 200 is configured for insertion into one of the cooling holes 162 in the cylindrical body 161 of the air separator 160 (as shown in FIG. 8). The flow diverter 200 precludes the impingement of the cooling flow on the bulky aft end 56 of the torque tube 50. Rather than radially impinging, the air flow is redirected in an axial direction (relative to the centerline of the gas turbine 2) downstream toward the turbine section 30.

As shown, the flow diverter 200 includes a cylindrical body 210 and a bottom panel 220 that closes one end of the cylindrical body 210. When the flow diverter 200 is installed through the air separator 160, the bottom panel 220 is proximate to the torque tube 50. A mounting flange 230 is disposed around the cylindrical body 210 at an open end 240. The mounting flange 230 extends radially outward of the cylindrical body 210, such that a diameter of the mounting flange 230 is greater than a diameter of the cylindrical body 210.

The mounting flange 230 defines a top surface 232, which may be provided with a key slot 233 to ensure the correct orientation of the flow diverter 200 in one of the cooling holes 162 of the air separator 160. The top surface 232 may be printed or marked with words, arrows, or other indicia (e.g., the words "WITH FLOW" and an arrow) to facilitate the proper orientation of the flow diverter 200 within the cooling hole 162.

The mounting flange 230 includes a pair of oppositely disposed tabs 235, each having a shape resembling a truncated right triangle with a radial leg 236 (extending from a diameter of the mounting flange 230) and an angled leg 237. The radial leg 236 of a first tab 235 is aligned along a common axis or diameter with the radial leg 236 of a second tab 235. The angled leg 237 of the first tab 235 is parallel to the angled leg 237 of the second tab 235. Although a truncated right triangle shape is shown for the tabs 235, it should be appreciated that other polygonal shapes may instead be used.

An equator 250, or central plane, is defined between the bottom panel 220 and the mounting flange 230. A collapsible region 260, which is centered around the equator 250, includes a concave circumferential recess 262 disposed on the inner surface of the cylindrical body 210 and may include a circumferential array of pre-scored notches 264 on the outer surface of the cylindrical body 210. To prevent the flow diverter 200 from being dislodged by the centrifugal motion of the rotor 40 during the operation of the gas turbine 2, an installer may use an installation tool 1000 (see FIG. 8) to cause the collapsible region 260 to collapse away from an axial centerline of the flow diverter 200.

A plurality of air flow vents 270 is disposed around a portion of the circumference of the cylindrical body 210 between the bottom panel 220 and the equator 250. In certain embodiments, the air flow vents 270 may extend around more than 40% of the circumference of the cylindrical body 210 and around no more than 75% of the circumference. An angle beta (β) may be defined between the edge of a first air vent 270 and the remote edge of a last air vent 270 of the plurality of air vents 270. The angle beta β, as shown in FIG. 6, may be in range of 144 degrees to 270 degrees. The air flow vents 270 may have a square shape, as shown, or may have some other regular or irregular shape. In at least one embodiment, the flow vents 270 are identically sized and shaped. In an alternate embodiment (not shown), a single, slot-shaped air flow vent 270 may be used.

The key slot 233 in the mounting flange 230 can be used to orient at least one of the flow diverters 200 in the appropriate direction, such that the air flow vents 270 are disposed toward the turbine section 30 of the gas turbine 2. As a result, the air flow turns from a radial direction to an axial direction (relative to the centerline of the gas turbine 2) and moves in a downstream direction toward the turbine section 30. In one embodiment, the plurality of air flow vents 270 include an odd number of air flow vents 270, and the key slot 235 is disposed opposite a center air flow vent 270 of the odd number of air flow vents 270.

Figure 5:
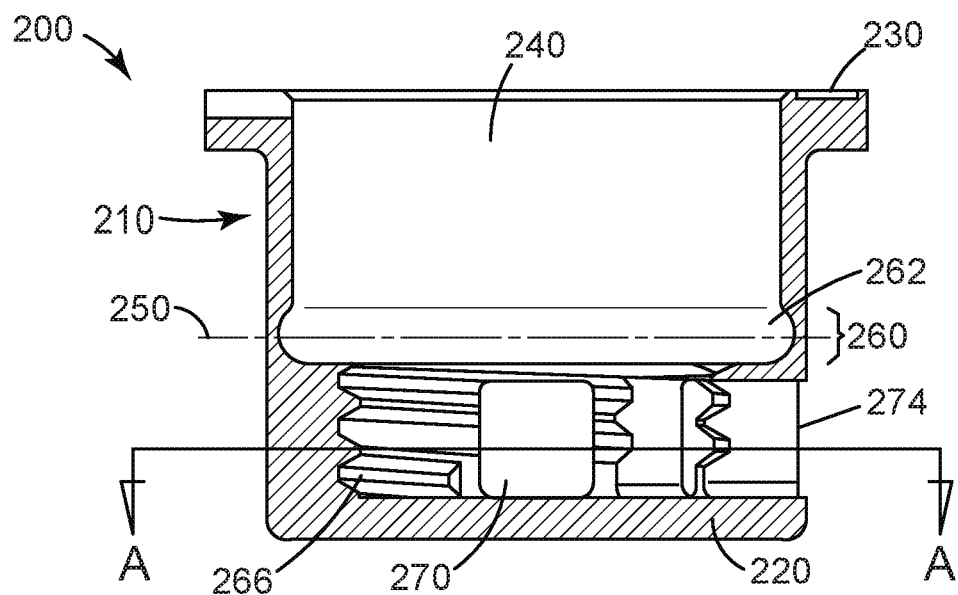
FIG. 5 is a cross-sectional side view of the flow diverter of FIG. 4.

As shown in FIGS. 5, 7, and 8, a portion of the interior surface of the cylindrical body 210, which is disposed between the circumferential recess 262 at the equator 250 and the bottom panel 220, is threaded to receive an installation tool 1000. The threads 266 extend around the interior surface of the cylindrical body 210, including on the interior surfaces of the struts 274 between adjacent air flow vents 270.

As shown in FIG. 8, the installation tool 1000 includes a tool body 1010, which may be cylindrical or some other shape. The tool body 1010 defines a threaded passage 1012 therethrough. A threaded rod 1020, which has a first end 1022 and a second end 1024, is threadingly inserted through the threaded passage 1012 and is secured at the second end 1024 by a nut 1030. The first end 1022 of the threaded rod 1020 has a greater diameter than the second end 1024, and the first end 1022 has a dimension corresponding to the threads 266 on the interior of the cylindrical body 210.

The first end 1022 of the threaded rod 1020 is engaged with the threads 266 of the cylindrical body 210. Due to this engagement, the tool body 1010 contacts the mounting flange 230 of the flow diverter 200. As the threaded rod 1020 is rotated, the first end 1022 of the threaded rod 1020 is pulled in an upward direction (away from the aft end 56 of the torque tube 50), causing the collapsible region 260 to collapse. The outer profile of the cylindrical body 210 at the equator 250 increases due to the material in the collapsible region 260 being compressed. The increased material 252 at the equator 250 engages an inner surface of the air separator 160, preventing the flow diverter 200 from becoming dislodged by the rotation of the rotor 40, the torque tube 50, and the air separator 160.

Advantageously, the installation of the flow diverters 200 in the cooling holes 162 of the air separator 160 (or, alternately, cooling holes 62 of air separator 60) may be accomplished without removing the rotor 40 from the gas turbine 2, making the use of the flow diverters 200 practical in existing gas turbine installations as well as new builds. By avoiding the removal of the rotor 40, the outage duration is significantly minimized, and the availability of the gas turbine 2 for power generation is enhanced.

The flow diverters 200 are simple and relatively inexpensive to produce (e.g., using additive manufacturing or other fabrication techniques) and are easy to install. The key slot 233 in the mounting flange 230 can be used to orient at least one of the flow diverters 200 in the appropriate direction, and the use of the mating tabs 235 ensures that adjacent flow diverters 200 are properly aligned to direct the cooling flow in the desired downstream direction.

Figure 9:
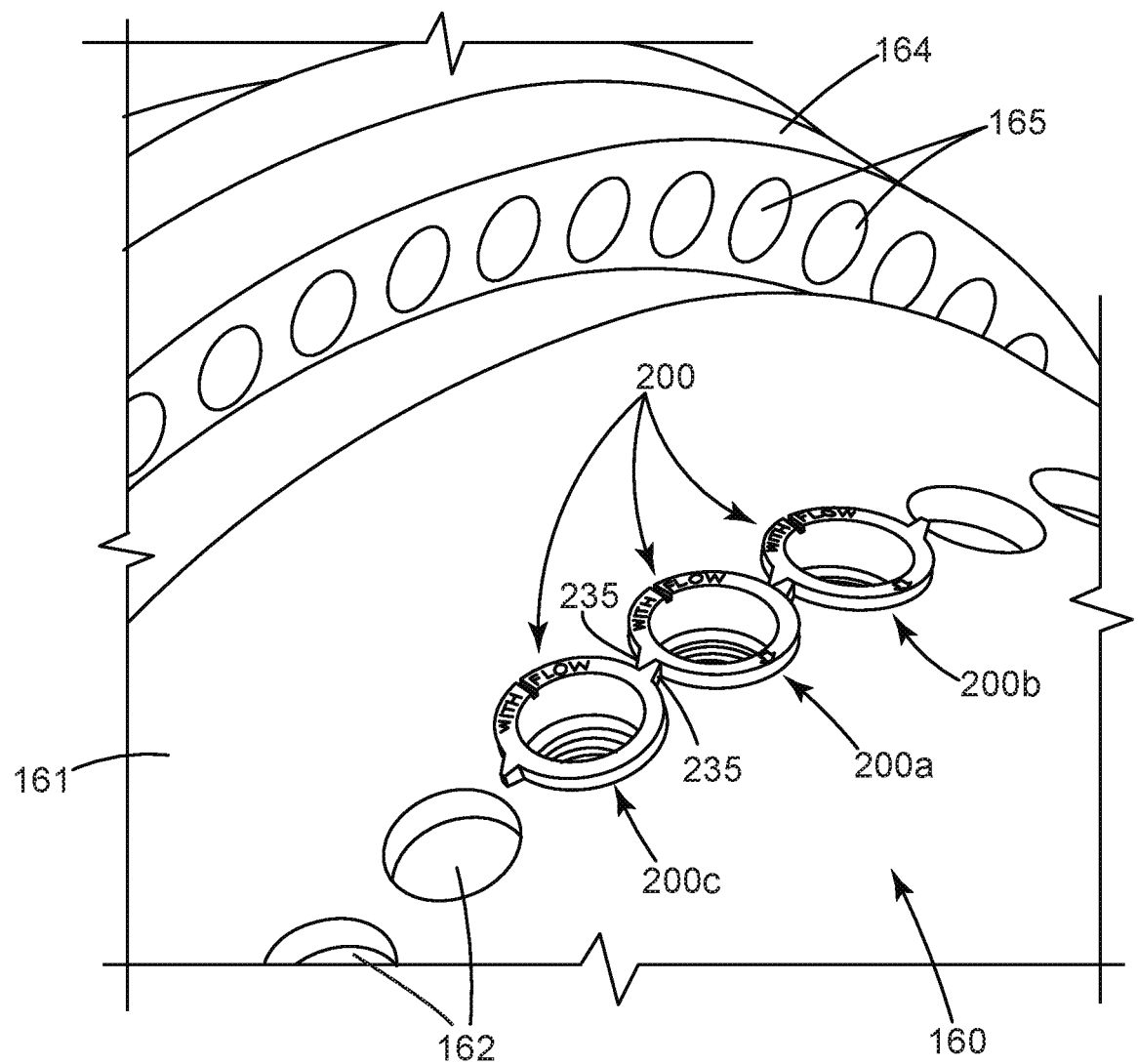
FIG. 9 is a perspective view of a portion of the air separator of FIG. 1, in which several of the flow diverters of FIG. 4 are installed.
Figure 10:
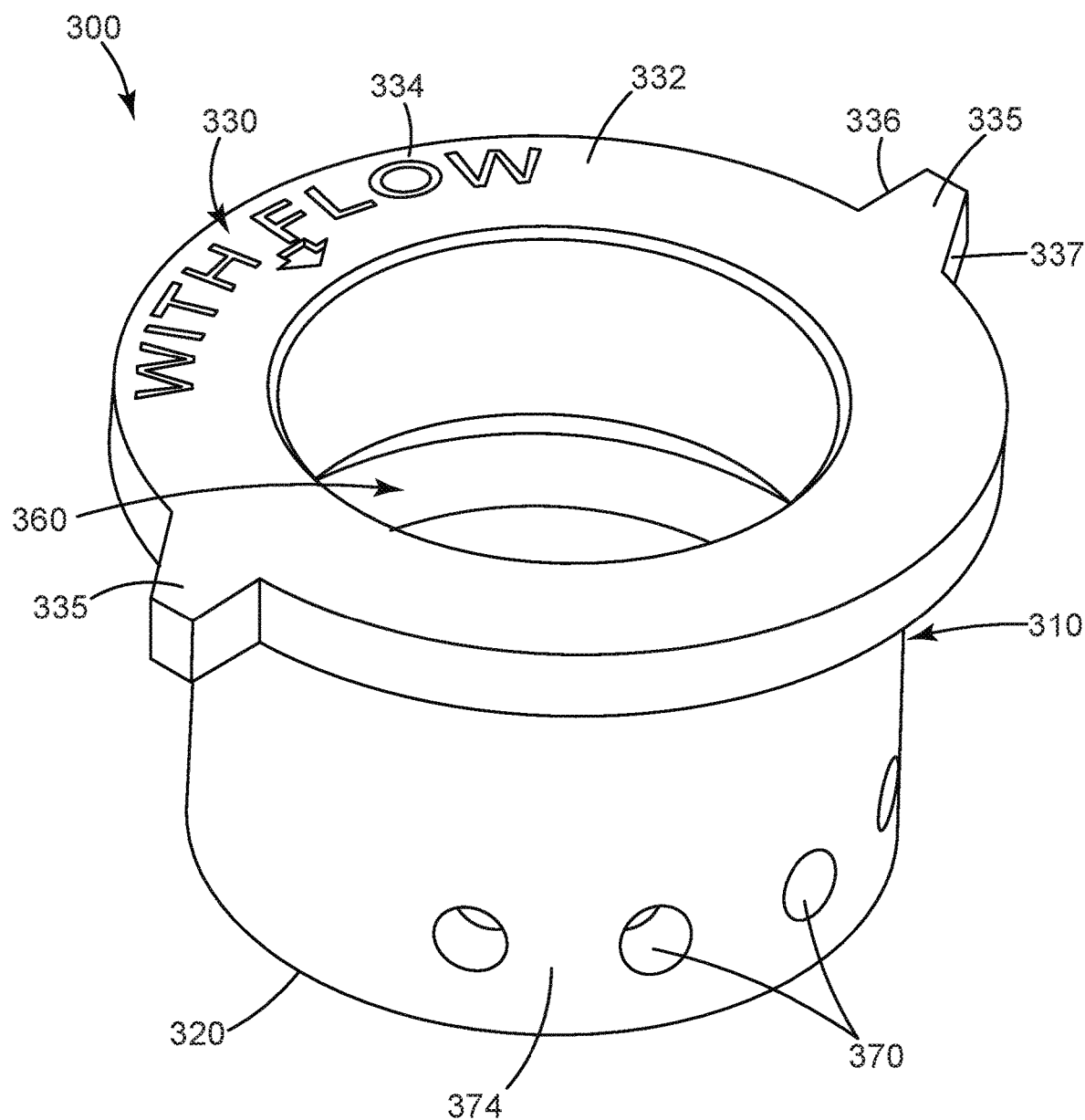
FIG. 10 is a side perspective view of a flow diverter useful with the air separator of FIG. 1 or 2, according to a further aspect of the present disclosure.
Figure 11:
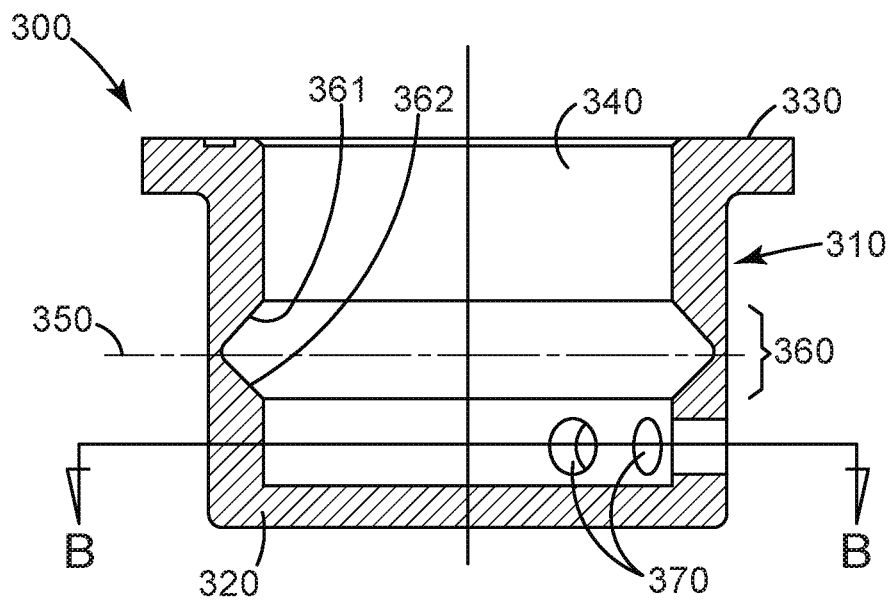
FIG. 11 is a cross-sectional side view of the flow diverter of FIG. 10.

FIG. 9 illustrates three exemplary flow diverters 200 as installed in three adjacent cooling holes 162 of the air separator 160. As described above, the tabs 235 of a first flow diverter 200a are in contact with a complementary tab 235 of an adjacent flow diverter 200b, 200c. The key slots 233 are parallel with one another and oriented in the same direction. Although FIG. 9 illustrates the flow diverters 200 in adjacent holes 162 as may imply that the flow diverters 200 are present in each cooling hole 162, such an arrangement is not required. Rather, it may be sufficient to install the flow diverters 200 in only some portion of the cooling holes 162, such as in every other cooling hole 162, in every third cooling hole 162, or in some other pattern which may, or may not, include the flow diverters 200 being installed in adjacent cooling holes 162.

FIGS. 10 through 14 illustrate an alternate flow-diverting system for diverting flow through the air separator 160, according to yet another aspect of the present disclosure. A flow diverter 300 is configured for insertion into one of the cooling holes 162 in the cylindrical body 161 of the air separator 160 (as shown in FIG. 8) or in one of the cooling holes 62 of the air separator 60 (as shown in FIG. 1). The flow diverter 300 precludes the impingement of the cooling flow on the bulky aft end 56 of the torque tube 50. Rather than radially impinging, the air flow is redirected in an axial direction downstream toward the turbine section 30.

The flow diverter 300 has many similar features as the flow diverter 200. Accordingly, the benefits described above with respect to the flow diverter 200 likewise result from the use of the flow diverter 300.

As shown, the flow diverter 300 includes a cylindrical body 310 and a bottom panel 320 that closes one end of the cylindrical body 310. When the flow diverter 300 is installed in the air separator 160, the bottom panel 320 is proximate to the torque tube 50. A mounting flange 330 is disposed around the cylindrical body 310 at an open end 340. The mounting flange 330 extends radially outward of the cylindrical body 310, such that a diameter of the mounting flange 330 is greater than a diameter of the cylindrical body 310.

Figure 4:
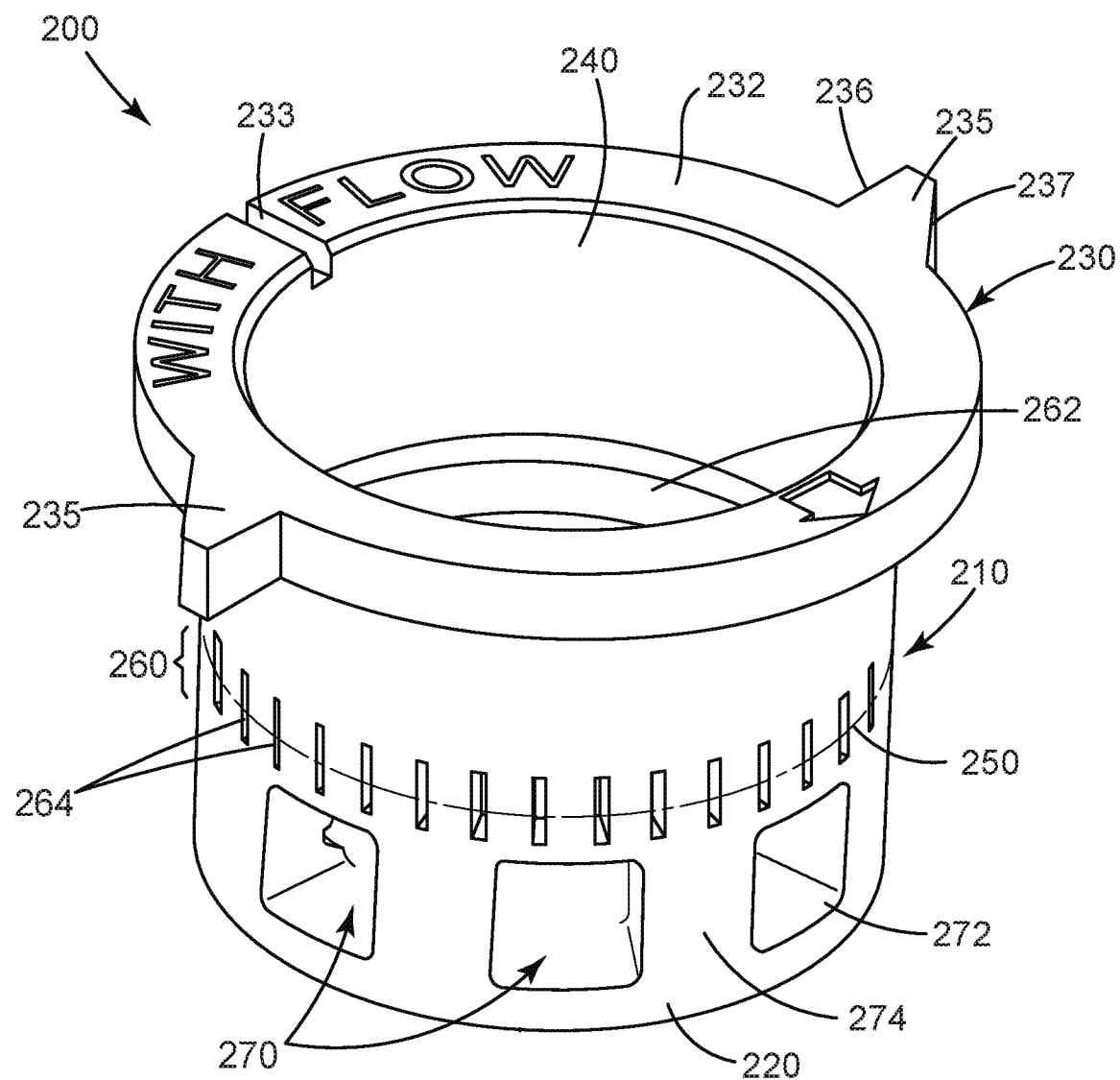
FIG. 4 is a side perspective view of a flow diverter useful with the air separator of FIG. 1 or 2, according to another aspect of the present disclosure.

The mounting flange 330 defines a top surface 332, which may be provided with a key slot (as shown in FIG. 4) to ensure the correct orientation of the flow diverter 300 in one of the cooling holes 162 of the air separator 160. Alternately, or in addition, the top surface 332 may be printed or marked with words, arrows, or other indicia 334 (e.g., the words "WITH FLOW" and an arrow) to facilitate the proper orientation of the flow diverter 300 within the cooling hole 162.

The mounting flange 330 includes a pair of oppositely disposed tabs 335, each having a shape resembling a truncated right triangle with a radial leg 336 (extending from a diameter of the mounting flange 330) and an angled leg 337. The radial leg 336 of a first tab 335 is aligned along a common axis or diameter with the radial leg 336 of a second tab 335. The angled leg 337 of the first tab 335 is parallel to the angled leg 337 of the second tab 335. Although a truncated right triangle shape is shown for the tabs 335, it should be appreciated that other polygonal shapes may instead be used.

An equator 350, or central plane (shown in FIG. 11), is defined between the bottom panel 320 and the mounting flange 330. A collapsible region 360, which is centered around the equator 350, includes a diverging portion 361 and a converging portion 362 disposed on the inner surface of the cylindrical body 310. That is, the collapsible region 360 has a circumferential V-shaped profile. To prevent the flow diverter 300 from being dislodged by the centrifugal motion of the rotor 40 during the operation of the gas turbine 2, an installer may use an installation tool (not shown) to cause the collapsible region 360 to collapse away from an axial centerline of the flow diverter 300.

Figure 12:
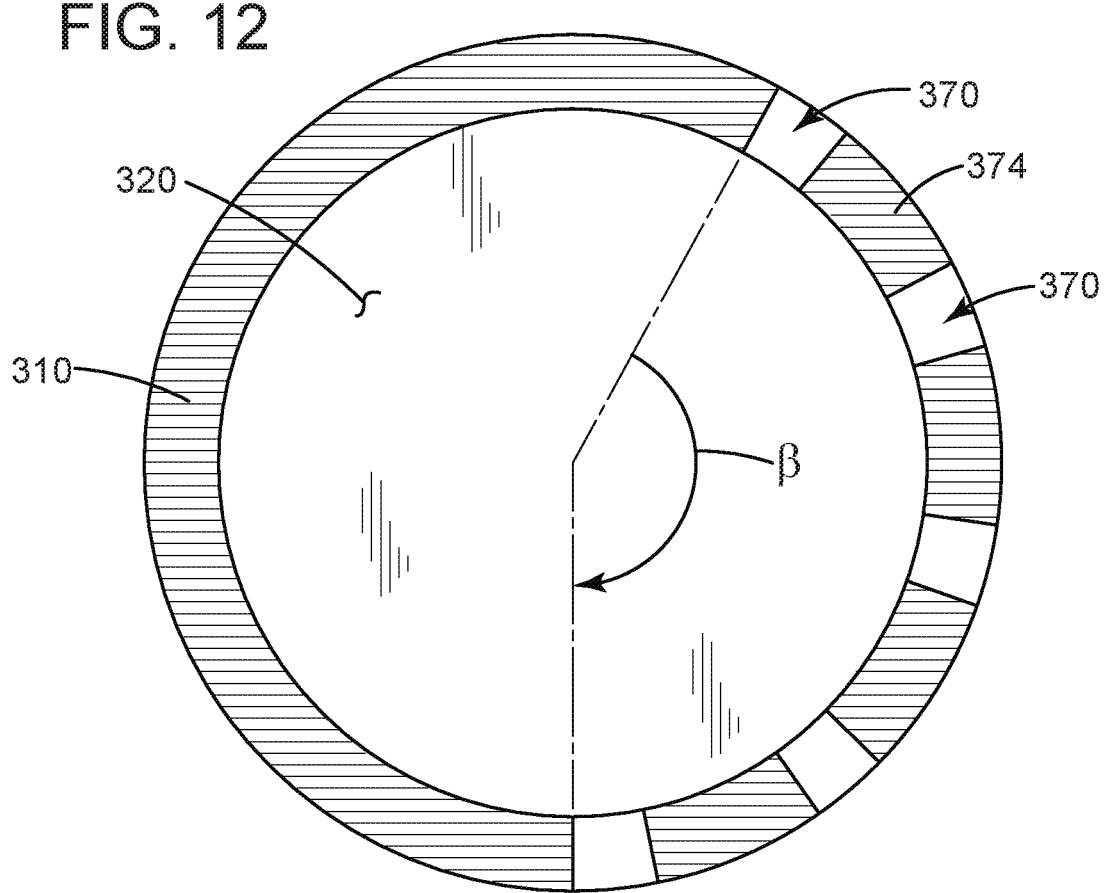
FIG. 12 is a schematic plan view of the flow diverter of FIG. 10, as taken through line B-B of FIG. 10.

A plurality of air flow vents 370 is disposed around a portion of the circumference of the cylindrical body 310 between the bottom panel 320 and the equator 350. In certain embodiments, the air flow vents 370 may extend around more than 40% of the circumference of the cylindrical body 310 and around no more than 75% of the circumference. An angle beta (β) may be defined between the edge of a first air vent 370 and the remote edge of a last air vent 370 of the plurality of air vents 370. The angle beta β, as shown in FIG. 12, may be in range of 144 degrees to 270 degrees. The air flow vents 370 may have a circular shape, as shown, or may have some other regular or irregular shape. In at least one embodiment, the flow vents 370 are identically sized and shaped.

Figure 13:
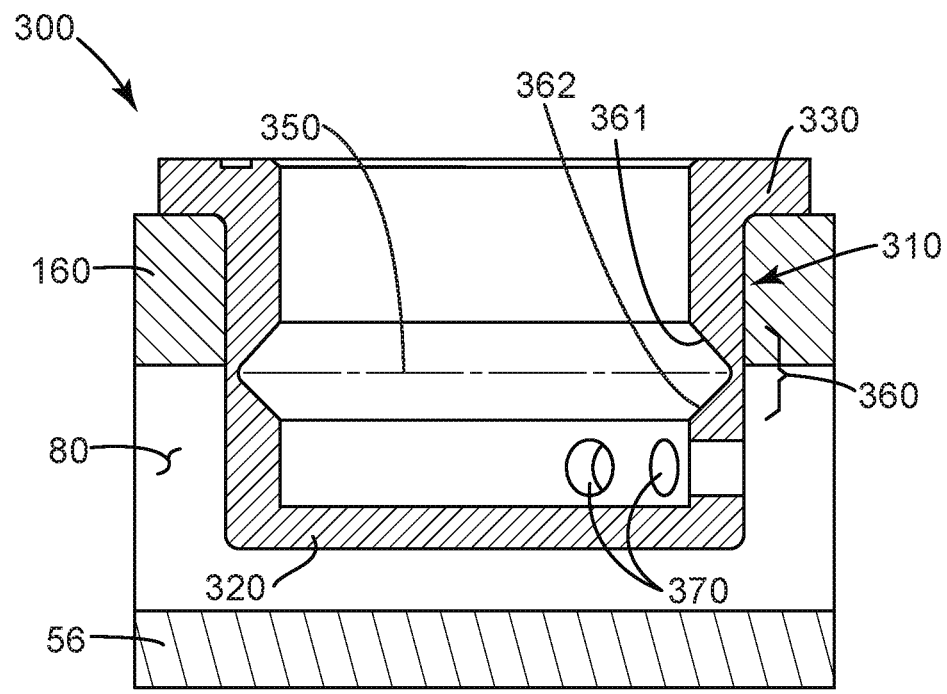
FIG. 13 is a cross-sectional side view of the flow diverter of FIG. 10, as inserted in an air separator.

FIG. 13 shows the flow diverter 300 as initially inserted within a cooling hole 162 of the air separator 160. As inserted, the mounting flange 330 of the flow diverter 300 contacts the outer surface of the air separator 160 and prevents the flow diverter 300 from falling through the cooling hole 162. The cylindrical body 310 is sized to fit snugly within the cooling hole 162. The air flow vents 370 are disposed to direct the air flow in a downstream direction toward the turbine section 30 (as shown in FIG. 1).

Figure 14:
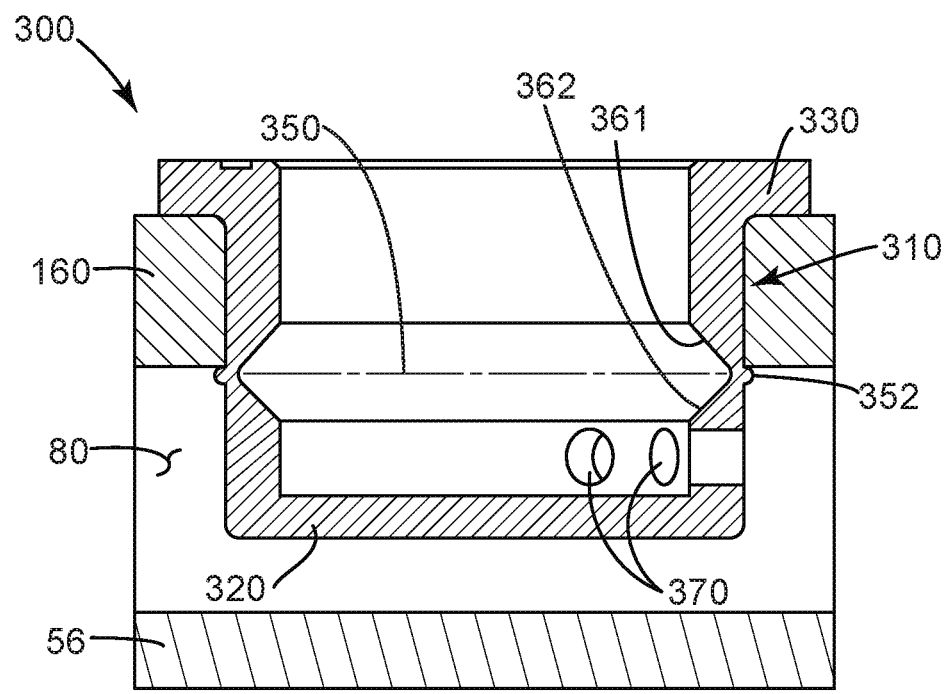
FIG. 14 is a cross-sectional side view of the flow diverter of FIG. 10, when fully installed in an air separator.

FIG. 14 shows the flow diverter 300 as installed within the cooling hole 162 of the air separator. A tool (not shown) is used to push the V-shaped collapsible portion 360 in a radially outward direction away from a longitudinal axis of the flow diverter 300, causing the cylindrical body 310 to increase in diameter at the equator 350. The displaced material 352 engages the inner surface of the air separator 160 and prevents the flow diverter 300 from being dislodged during rotation of the shaft 40, the torque tube 50, and the air separator 160.

Exemplary embodiments of the flow-diverting systems for a gas turbine air separator are described above in detail. The flow-diverting systems described herein are not limited to the specific embodiments described herein, but rather, components of the flow-diverting systems may be utilized independently and separately from other components described herein. For example, the flow-diverting systems and air separator described herein may have other applications not limited to practice with turbine nozzles for power-generating gas turbines, as described herein. Rather, the flow-diverting systems and air separator described herein may be implemented and utilized in various other industries.

While the technical advancements have been described in terms of various specific embodiments, those skilled in the art will recognize that the technical advancements can be practiced with modification within the spirit and scope of the claims.

What is claimed is:

1. A flow diverter for an air separator of a gas turbine, the flow diverter comprising:
   a cylindrical body configured to fit within a cooling hole of the air separator, the cylindrical body defining one or more air flow vents arranged around a portion of a circumference of the cylindrical body;
   a bottom panel closing the cylindrical body at one end;
   a mounting flange surrounding the cylindrical body at an open end thereof and extending radially outward from the cylindrical body;
   wherein the cylindrical body defines an equator between the bottom panel and the mounting flange;

wherein the cylindrical body is collapsible along the equator during installation, such that, when the flow diverter is installed, an outer profile of the cylindrical body extends radially outward from the equator and prevents the flow diverter from disengaging from the cooling hole of the air separator; and wherein, when the flow diverter is installed, air flows through the open end in a radial direction, relative to a centerline of the gas turbine, and exits through the one or more air flow vents in an axial direction, relative to the centerline of the gas turbine.

2. The flow diverter of claim 1, wherein the portion of the circumference through which the one or more air flow vents is arranged is at least 40% of the circumference and is less than 75% of the circumference.

3. The flow diverter of claim 1, wherein the one or more air flow vents comprise a plurality of air flow vents; and wherein each air flow vent of the plurality of air flow vents defines a square shape or a circular shape.

4. The flow diverter of claim 3, wherein the plurality of air flow vents comprises an odd number of air flow vents.

5. The flow diverter of claim 4, wherein the mounting flange defines a key slot, the key slot being disposed opposite a center air flow vent of the plurality of air flow vents.

6. The flow diverter of claim 1, wherein the mounting flange comprises a pair of circumferentially spaced tabs, a first tab of the pair of circumferentially spaced tabs having a first radial surface and a first angled surface, and the second tab of the pair of circumferentially spaced tabs having a second radial surface aligned with the first radial surface along a common axis and a second angled surface, the second angled surface being parallel to the first angled surface.

7. The flow diverter of claim 1, wherein an interior surface of the cylindrical body defines threads for engagement of a threaded tool, the threads extending between the equator and the bottom surface.

8. An air separator for a gas turbine, the air separator comprising:
a forward flange comprising a plurality of bolt holes circumferentially arrayed about the forward flange;
an aft flange axially spaced from the forward flange;
a cylindrical body extending between the forward flange and the aft flange, the cylindrical body comprising a plurality of cooling holes disposed circumferentially around the cylindrical body and further comprising a recessed portion extending circumferentially around the cylindrical body proximate to the forward flange;
wherein the recessed portion comprises a plurality of supplemental cooling holes arrayed circumferentially around the recessed portion.

9. The air separator of claim 8, wherein the plurality of cooling holes is greater in number than the plurality of supplemental cooling holes.

10. The air separator of claim 8, further comprising a flow diverter installed within a first cooling hole of the plurality of cooling holes, the flow diverter comprising: a cylindrical body configured to fit within the first cooling hole, the cylindrical body defining one or more air flow vents arranged around a portion of a circumference of the cylindrical body; a bottom panel closing the cylindrical body at one end; a mounting flange surrounding the cylindrical body at an open end thereof and extending radially outward from the cylindrical body.

11. The air separator of claim 10, wherein the portion of the circumference through which the one or more air flow vents is arranged is at least 40% of the circumference and is less than 75% of the circumference.

12. The air separator of claim 10, wherein the one or more air flow vents comprise a plurality of air flow vents; and wherein each air flow vent of the plurality of air flow vents defines a square shape or a circular shape.

13. The air separator of claim 12, wherein the plurality of air flow vents comprises an odd number of air flow vents; and wherein a radially outward surface of the mounting flange defines a key slot, the key slot being disposed opposite a center air flow vent of the plurality of air flow vents.

14. The air separator of claim 10, wherein the mounting flange comprises a pair of circumferentially spaced tabs, a first tab of the pair of circumferentially spaced tabs having a first radial surface and a first angled surface, and the second tab of the pair of circumferentially spaced tabs having a second radial surface aligned with the first radial surface along a common axis and a second angled surface, the second angled surface being parallel to the first angled surface.

15. The air separator of claim 10, further comprising a second flow diverter installed within a second cooling hole of the plurality of cooling holes, the second cooling hole being adjacent to the first cooling hole; and wherein the second flow diverter comprises a mounting flange having a pair of circumferentially spaced tabs, a third tab of the pair of circumferentially spaced tabs having a third radial surface and a third angled surface, and the fourth tab of the pair of circumferentially spaced tabs having a fourth radial surface aligned with the third radial surface along a common axis and a fourth angled surface, the fourth angled surface being parallel to the third angled surface; and wherein the second radial surface of the first flow diverter is aligned with and contacts the third radial surface of the second flow diverter.

16. The air separator of claim 10, wherein the cylindrical body defines an equator between the bottom panel and the mounting flange; and wherein the cylindrical body is collapsible along the equator during installation, such that, when the flow diverter is installed, an outer profile of the cylindrical body extends radially outward from the equator and prevents the flow diverter from disengaging from the cooling hole of the air separator.

17. The air separator of claim 10, wherein an interior surface of the cylindrical body defines threads for engagement of a threaded tool, the threads extending between the equator and the bottom surface.

18. The air separator of claim 10, further comprising a plurality of flow diverters installed within respective cooling holes of the plurality of cooling holes; each flow diverter of the plurality of flow diverters comprising: a cylindrical body configured to fit within the first cooling hole, the cylindrical body defining one or more air flow vents arranged around a portion of a circumference of the cylindrical body; a bottom panel closing the cylindrical body at one end; a mounting flange surrounding the cylindrical body at an open end thereof and extending radially outward from the cylindrical body.

19. The air separator of claim 10, wherein the plurality of flow diverters is equal in number to the plurality of cooling holes.

* * * * *